United States Patent [19]
Nettleton et al.

[11] Patent Number: 5,315,363
[45] Date of Patent: May 24, 1994

[54] NIGHT VISION PROJECTED INFRARED CUEING SYSTEM

[75] Inventors: John E. Nettleton, Fairfax Station; Dallas N. Barr; James D. Habersat, both of Woodbridge; Jonathan S. Lei, Springfield, all of Va.

[73] Assignee: The United States of America as represented by the Secretary of the Army, Washington, D.C.

[21] Appl. No.: 84,100

[22] Filed: Jul. 1, 1993

[51] Int. Cl.⁵ ............................................. G01S 13/00
[52] U.S. Cl. .......................................... 356/4; 342/29
[58] Field of Search ................. 342/29, 61, 63, 82; 356/4; 250/341

[56] References Cited

U.S. PATENT DOCUMENTS

| | | | |
|---|---|---|---|
| 3,046,546 | 7/1962 | Lord | 342/29 |
| 3,134,975 | 5/1964 | Goodman | 342/29 |
| 3,830,567 | 8/1974 | Riegl | 356/5 |
| 4,755,818 | 7/1988 | Conrad | 342/29 |
| 4,952,911 | 8/1990 | D'Ambrosia et al. | 356/4 |
| 5,111,210 | 5/1992 | Morse | 342/455 |

Primary Examiner—Mark Hellner
Attorney, Agent, or Firm—John E. Holford; Milton W. Lee; Anthony T. Lane

[57] ABSTRACT

Circuitry and method to enhance the infrared illumination of nearby obstacles detected by lidar, radar and passive IR detectors on low flying high speed aircraft.

10 Claims, 3 Drawing Sheets

NIGHT VISION PROJECTED INFRARED CUEING SYSTEM

BACKGROUND OF THE INVENTION

1. Field of the Invention

The present invention generally relates to night vision infrared imaging systems as used in helicopters, e.g. night vision goggles.

2. Description of Prior Art

Beginning September 1990, a system was built and subsequently flight tested using a projected cueing technique as a warning in terrain avoidance. The services in this and other countries have tested prototype night vision sensors to detect and display small obstacles such as wires and poles. These types of obstacles are particularly hazardous to low flying helicopters and certain fixed wing aircraft that fly similar reconnaissance missions. These sensors include both laser systems such as the British LOCUS $CO_2$ laser light detection and ranging system (lidar) and conventional microwave radars such as the french ROMEO radar. The U.S. Army has recently awarded a contract for a diode laser lidar under the name of OASYS. All these systems employ some form of warning system inside the cockpit, which may include an audible alarm and/or an indication on a heads-up or heads-down display. These indirect warning systems have the limitation that while the obstacle location is indicated, the hazard may not be seen or correctly evaluated by the pilot. There is a need for a cueing system that interacts directly and visually with the pilot to better locate and identify an obstacle in the shortest possible time.

SUMMARY OF THE INVENTION

According to the invention, the circuitry of lidar, radar or passive target locating systems, like those mentioned above, are extended to include the additional function of temporarily increasing the illumination of the obstacle, at a time which permits a better response by the pilot. The increase in illumination is preferably provided by the same IR source that locates the obstacle and is converted to visible by means of IR goggles worn by the pilot.

It is therefore one object of the invention to provide an improved obstacle avoidance system which permits a more reliable and intuitive pilot response under reduced light conditions.

It is another object of the present invention to provide a more reliable system of type described above for ill-defined obstacles such as electric wires and the like.

It is yet another object of the invention to provide a more reliable system as above wherein a minimum number of additional circuit elements are required.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
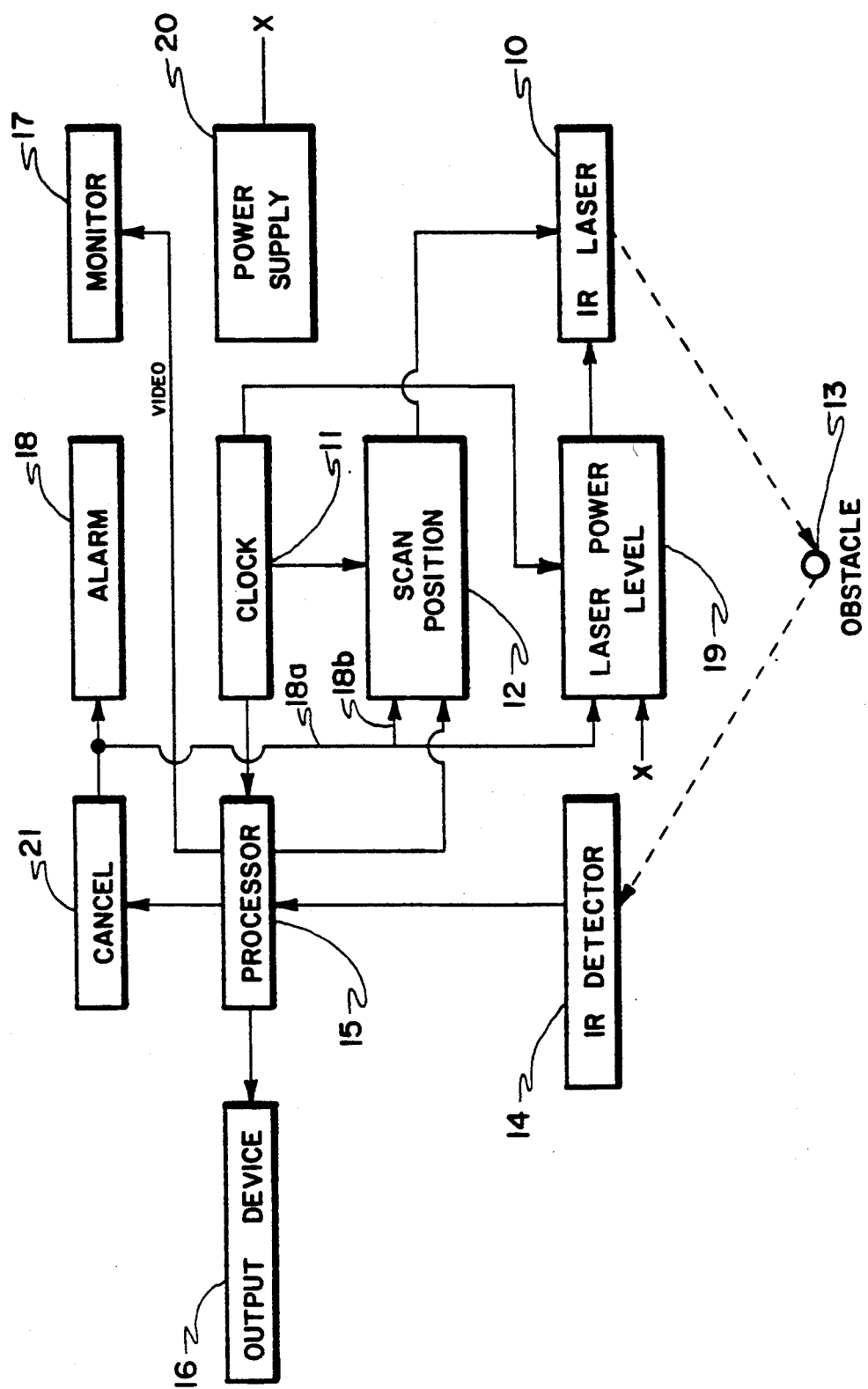
FIG. 1 is an embodiment of the present invention as applied to a lidar target acquisition or obstacle locating system.

Referring now to the drawings, and more particularly to FIG. 1, there is shown, in block diagram, the components of an active type infrared lidar system for altitude and range measurements, terrain mapping and obstacle avoidance. This system, designed to operate with a single detector, is equipped with a narrow beam diode type scanning laser 10. The beam is scanned over a field of regard by means an electro-optic device such as a set of vibrating mirrors rotating about horizontal and vertical axes, rotating optical wedges or a similar electro-mechanical drive to rotate the laser diode itself. Bias level and synchronizing clock circuitry 11 provides the required drive functions for pulsing the laser and the sample and hold type scan position circuit 12 to produce a scan according to practices well known in the art. There are also ranging systems where the laser is fixed on the aircraft without a scanning device and any scanning is the result of the attitude or movement of that aircraft. Target return pulses from an obstacle 13 are sensed by a detector 14 and analyzed by processor 15 to produce an alarm signal for obstacles within a preselected range, entered by the pilot. The clock circuitry is also coupled to the processor, so as to supply time bases for the range determinations and a video signal for the monitor.

Other functions of the processor are to increase the gain, remove noise, set contrast and otherwise convert the signals to satisfy various output devices. Output signals may be supplied to an output device 16 as shown, this may be a recorder, a computer or telemetry, as examples. The processor also analyzes reflected pulse widths, strengths and time delays, to define likely targets or obstacles and their ranges. The obstacle with the smallest range is displayed on a monitor 17 in front of the pilot. The display includes relevant target data abstracted by the processor, e.g. range, horizontal and vertical coordinates, apparent size, shape, etc.

The range of this displayed object is monitored against a threat threshold range until the object passes from view, is replaced by an object with a smaller range or becomes equal to or smaller than the threshold. When the latter occurs a threat pulse is transmitted by the processor to an alarm 18, causing a blinking visual and/or a modulated audible warning signal in the cockpit with the pilot. The pilot, who wears night vision goggles under the low light conditions for which the range finder is intended; may attempt, at this point, to locate the obstacle visually. The image intensifiers in the goggles, however, are not as sensitive as the diodes in the range finder, and the target may not be apparent to him. This is particularly true of small targets like transmission lines, which are particularly hazardous.

To remedy this, a laser power level control circuit 19 is inserted between the x-output of the power supply 20, which denotes a common supply for all circuits shown, and the laser. The control circuit is energized through a lead 18A from the alarm input by the same signal that controls the alarm. The control circuit raises the average input power for the laser to a higher level, perhaps an order of magnitude higher. Also, if the laser beam is scanned, a lead 18B may be provided from the input of the alarm to the scan position circuit. This circuit stores the scan coordinate drive signals that produce the obstacle return responses from the detector and processor. It can thus use the response of the obstacle to limit the scanning process; so that the beam scans only on the obstacle, greatly increasing the maximum reflection therefrom. Either or both of these actions can increase the visibility of the obstacle to a comfortable level for the pilot. Since the normal power level of the laser is very low, increasing it by an order of magnitude poses no threat to the pilot's vision. A cancel circuit or switch 21 inserted between the processor and the alarm input allows the pilot to shut off the laser, by pressing a button and then return the system to normal power and scan, by releasing the button as security permits.

Figure 2:
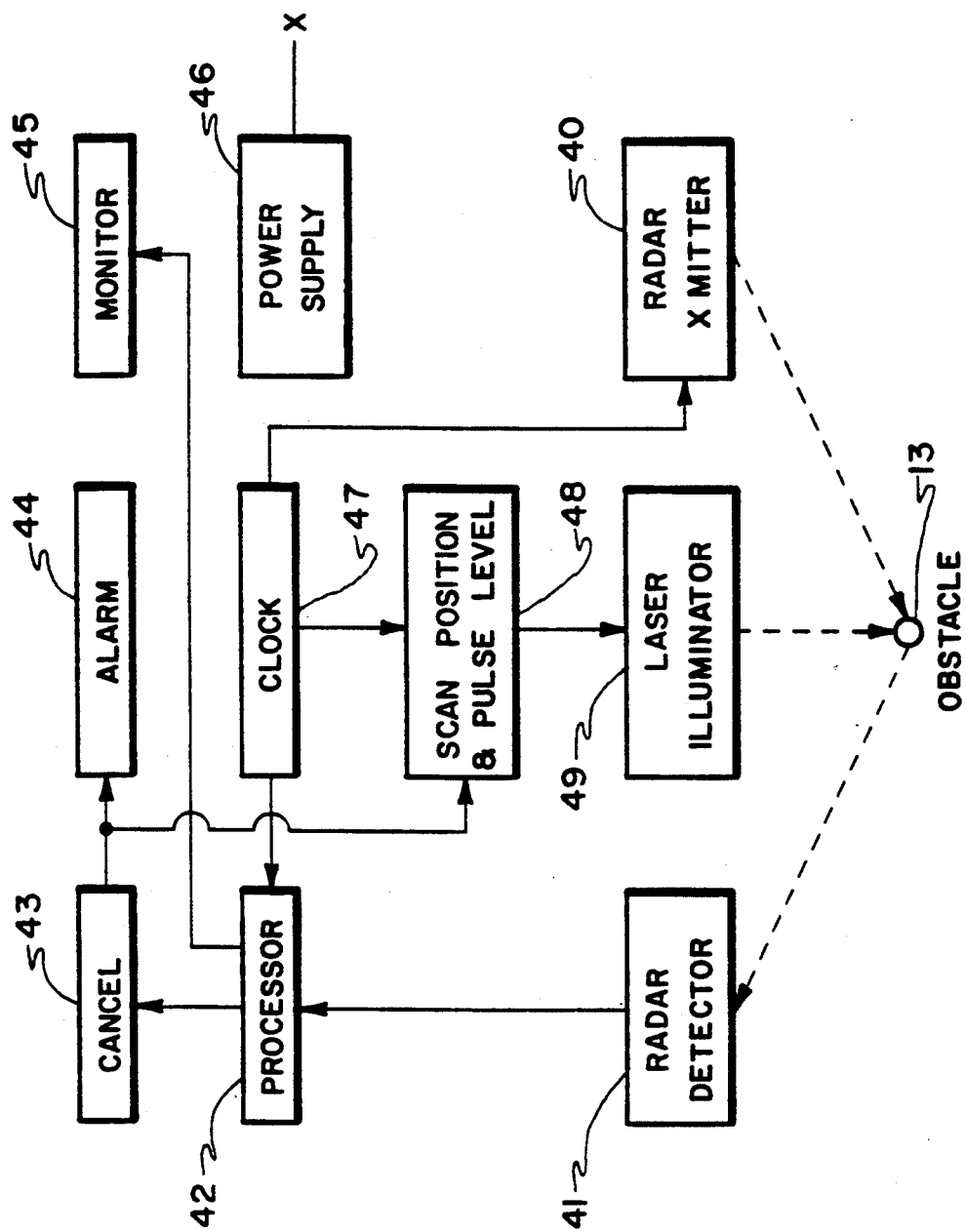
FIG. 2 is another embodiment of the present invention as applied to a radar target acquisition or obstacle locating.

FIG. 2 shows a different range finder arrangement. The ranging elements are a radar transmitter 40 and a radar detector 41. The signal processor 42, cancel circuit 43, alarm 44, monitor 45, power supply 46, and clock 47 are substantially the same as in FIG. 1. The scan position and power level control circuits 48, shown as a single block, are also essentially the same, except that instead of being controlled by a laser range finder, they are controlled by an alarm pulse generated by the radar elements. The radar elements perform the ranging function unaffected by fog and like environmental limitations that apply to infrared. Any type of IR illuminator can be used, but a narrow beam scanned type, i.e. a laser, is preferred. The latter directed only toward obstacles near the aircraft is more efficient and less obtrusive.

Figure 3:
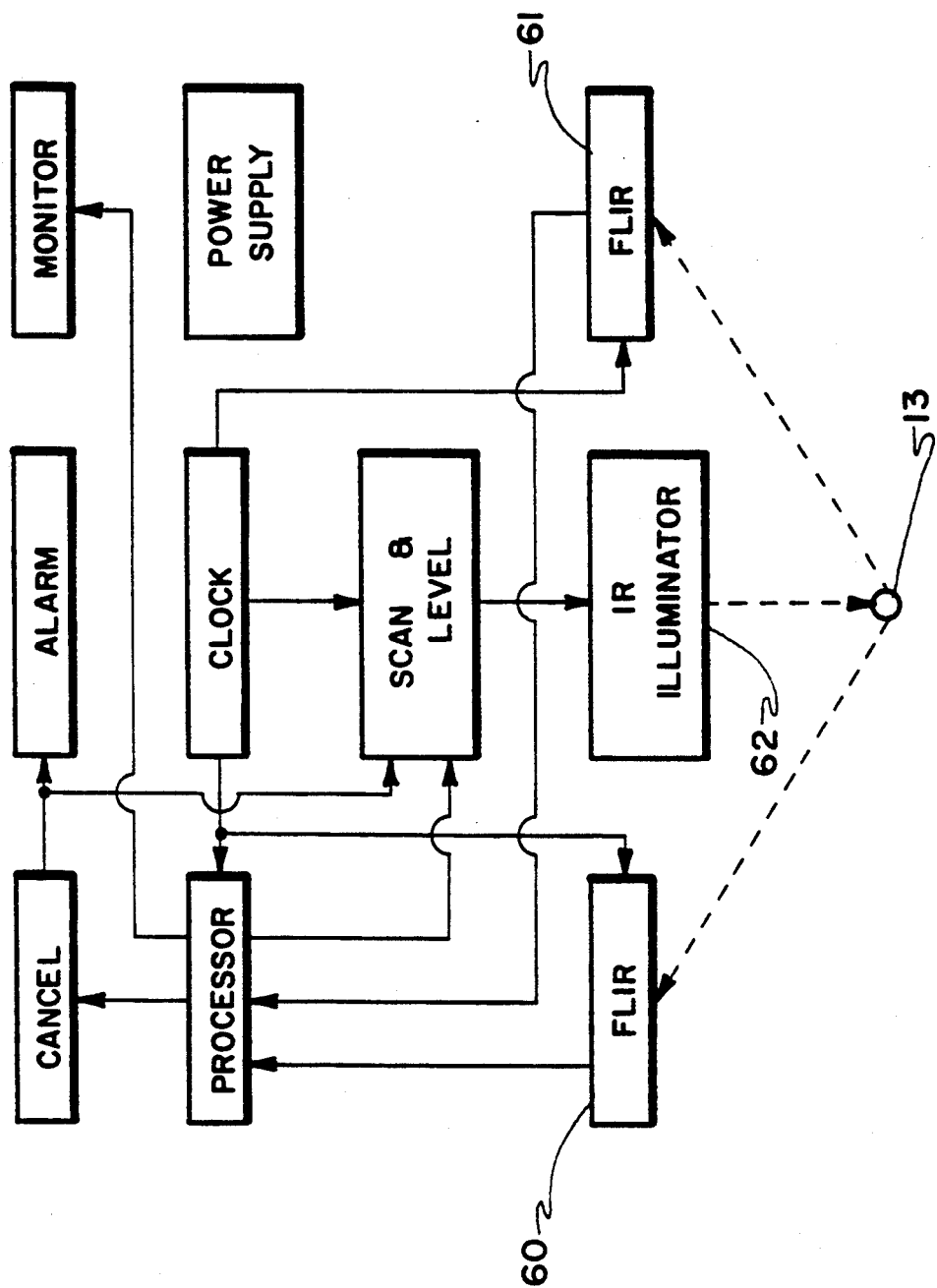
FIG. 3 is yet another embodiment of the invention as applied to a passive type IR detector such as the Forward Looking Infrared Imaging System (FLIR).

FIG. 3 shows an arrangement similar to FIG. 2 wherein the radar elements have been replaced with one or a pair of passive IR detectors 60 and 61 one or both of which may be imagers, e.g. FLIRs. Detectors such as FLIR's can display the appearance of an obstacle and, with narrow angle optics, can point out its direction. Optical focus gives an approximation of range, or two detectors can triangulate range. Pulsing the illuminator or laser provides a more accurate means of ranging an obstacle, but this is not done until the laser has been passively directed at the obstacle by signals from the processor. Even then the laser may be withheld or operated at a low level until the range becomes less than the threat threshold as outlined above. At dangerously close ranges the alarm system may activate the low level laser ranging, if not used previously, but it then quickly shifts to a high level mode which renders the target visible.

While this invention has been described in terms of preferred embodiment including IR laser range finders, those skilled in the art will recognize that the invention can be practiced with other optical systems within the spirit and scope of the appended claims.

Having thus described my invention, what I claim as new and desire to secure by Letters Patent is as follows:

1. An obstacle avoidance system for the pilot of a low flying aircraft; comprising:
   a forward looking infrared laser ranging device, having normal and enhanced illuminating modes of operation;
   an audio-visual alarm circuit means, coupled to said device, to alert said pilot when detection of an obstacle within a threshold distance from said aircraft by said ranging device initiates a warning pulse; and
   a highlighting circuit means coupled with said device to switch it to said enhanced mode in response to said warning pulse and thereby increase the level of infrared light illuminating said obstacle by approximately an order of magnitude.

2. A system according to claim 1; wherein:
   said highlighting means includes means to raise the power output of said laser.

3. A system according to claim 1; which includes a narrow beam angularly scanned laser and wherein:
   said highlighting means includes an acquisition circuit means to lock said laser beam on said target long enough to provide said increased detected level.

4. A system according to claim 2; which includes a narrow beam angularly scanned laser and wherein:
   said highlighting means includes an acquisition circuit means to lock said laser beam on said target.

5. A system according to claim 1; further including:
   a security circuit means, coupled with said device, to return said laser to its normal operating mode, when said obstacle can no longer be detected.

6. A system according to claim 2; further including:
   a security circuit means, coupled with said device, to return said laser to its normal operating mode, when said obstacle can no longer be detected.

7. A system according to claim 3; further including:
   a security circuit means, coupled with said device, to return said laser to its normal operating mode, when said obstacle can no longer be detected.

8. A system according to claim 4; further including:
   a security circuit means, coupled with said device, to return said laser to its normal operating mode, when said obstacle can no longer be detected.

9. A method for alerting the pilot of a low flying aircraft to the presence of a low visibility obstacle; including the steps of:
   A. Detecting the presence of said obstacle with an angularly scanned infrared laser ranging device;
   B. Displaying a visual indication of said obstacle's presence;
   C. Activating an alarm system, when said obstacle comes within a preselected threshold of visible range; and
   D. Illuminating said obstacle with radiation approximately an order of magnitude higher than the normal output of said ranging device when the range of said obstacle is less than said threshold of range for a period no longer than that over which said obstacle is detected.

10. The method according to claim 9, wherein step D is at least partially performed by:
   D1. temporarily narrowing the total scan angle of said laser ranging device substantially to the angle subtended by said obstacle.

* * * * *